United States Patent
Nakai et al.

(10) Patent No.: US 12,031,742 B2
(45) Date of Patent: Jul. 9, 2024

(54) CONTAMINANT DETECTOR AND REFRIGERATION CYCLE APPARATUS

(71) Applicant: Mitsubishi Electric Corporation, Tokyo (JP)

(72) Inventors: Takafumi Nakai, Tokyo (JP); Akira Morikawa, Tokyo (JP); Noriaki Katsumata, Tokyo (JP); Masaru Takada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/287,295

(22) PCT Filed: Apr. 28, 2021

(86) PCT No.: PCT/JP2021/017025
§ 371 (c)(1),
(2) Date: Oct. 18, 2023

(87) PCT Pub. No.: WO2022/230122
PCT Pub. Date: Nov. 3, 2022

(65) Prior Publication Data
US 2024/0085053 A1    Mar. 14, 2024

(51) Int. Cl.
*F24F 11/89*    (2018.01)
*F24F 140/30*   (2018.01)

(52) U.S. Cl.
CPC ......... *F24F 11/89* (2018.01); *F24F 2140/30* (2018.01)

(58) Field of Classification Search
CPC .............................. F24F 2140/30; F24F 11/89
See application file for complete search history.

(56) References Cited

U.S. PATENT DOCUMENTS

2018/0022318 A1   1/2018  Parsons et al.
2020/0003449 A1*  1/2020  Morikawa ............ G01N 29/223
(Continued)

FOREIGN PATENT DOCUMENTS

JP    2002-267514 A    9/2002
JP       6188994 B1    8/2017
(Continued)

OTHER PUBLICATIONS

International Search Report and Written Opinion mailed on Jul. 13, 2021, received for PCT Application PCT/JP2021/017025, filed on Apr. 28, 2021, 8 pages including English Translation.
(Continued)

*Primary Examiner* — Nelson J Nieves
(74) *Attorney, Agent, or Firm* — XSENSUS LLP

(57) ABSTRACT

A contaminant detector includes a detection object that is inclined relative to a horizontal direction in a drainage unit for accumulation of discharged water and on which a contaminant is to be deposited and a detection unit configured to emit energy toward the detection object to detect a contamination state of the detection object. The detection unit includes a transmission and reception module configured to emit and receive energy, a calculation module configured to calculate an amount of energy received from the detection object by the transmission and reception module, and a determination module configured to determine, based on the amount of energy calculated by the calculation module, the contamination state of the detection object.

8 Claims, 7 Drawing Sheets

(56) References Cited

U.S. PATENT DOCUMENTS

| | | | |
|---|---|---|---|
| 2020/0173670 A1* | 6/2020 | Suzuki | F24F 11/32 |
| 2020/0248918 A1* | 8/2020 | Handa | F24F 11/48 |
| 2020/0248924 A1* | 8/2020 | Suzuki | F24F 11/30 |
| 2021/0270479 A1* | 9/2021 | Nakai | G01N 17/008 |
| 2021/0333005 A1* | 10/2021 | Kitagawa | F24F 13/222 |
| 2021/0389015 A1 | 12/2021 | Kitagawa et al. | |
| 2022/0170864 A1* | 6/2022 | Kitagawa | F24F 13/22 |
| 2023/0119292 A1* | 4/2023 | Kataoka | F24F 11/32 |
| | | | 382/100 |
| 2023/0358591 A1* | 11/2023 | Coughlan | B01D 35/28 |

FOREIGN PATENT DOCUMENTS

| | | |
|---|---|---|
| JP | 2018-510323 A | 4/2018 |
| JP | 6456577 B1 | 1/2019 |
| JP | 6590725 B2 | 10/2019 |
| JP | 2020-139803 A | 9/2020 |
| WO | 2020/174800 A1 | 9/2020 |

OTHER PUBLICATIONS

Notice of Reasons for Refusal mailed on Feb. 1, 2022, received for JP Application 2021-556276, 6 pages including English Translation.
Decision to Grant mailed on Jun. 21, 2022, received for JP Application 2021-556276, 5 pages including English Translation.
Extended European Search Report issued Mar. 21, 2024 in European Patent Application No. 21939283.4, 7 pages.

* cited by examiner

CONTAMINANT DETECTOR AND REFRIGERATION CYCLE APPARATUS

CROSS-REFERENCE TO RELATED APPLICATION

This application is based on PCT filing PCT/JP2021/017025, filed Apr. 28, 2021, the entire contents of which are incorporated herein by reference.

TECHNICAL FIELD

The present disclosure relates to a contaminant detector that detects a state of contamination by contaminants and a refrigeration cycle apparatus.

BACKGROUND ART

A known contaminant detector detects a state of contamination by contaminants. Examples of contaminants in the presence of water include biofilms. The term "biofilm" as used herein refers to a semisolid slimy layer of microorganisms growing in water accumulated in a sump or a drainage channel. Biofilms are hygienically undesirable. A biofilm may block, for example, a discharge port through which accumulated water is discharged to a drainage channel. Patent Literature 1 discloses an air-conditioning apparatus including a drain pan to receive water, a discharge unit to discharge water received by the drain pan, and a detection unit to detect a biofilm as contaminants that form on the drain pan. The detection unit in Patent Literature 1 detects a biofilm after completion of a step of discharging water from the drain pan.

CITATION LIST

Patent Literature

Patent Literature 1: Japanese Patent No. 6188994

SUMMARY OF INVENTION

Technical Problem

In the air-conditioning apparatus disclosed in Patent Literature 1, a contamination state cannot be detected until the water discharging step is completed. For example, a sump or a drainage channel tends to have water. This leads to demands for devices capable of detecting a contamination state in the presence of water.

In response to the above issue, it is an object of the present disclosure to provide a contaminant detector that detects a contamination state even in the presence of water and a refrigeration cycle apparatus.

Solution to Problem

A contaminant detector according to an embodiment of the present disclosure includes a detection object that is inclined relative to a horizontal direction in a drainage unit for accumulation of discharged water and on which a contaminant is to be deposited, and a detection unit configured to emit energy toward the detection object to detect a contamination state of the detection object. The detection unit includes a transmission and reception module configured to emit and receive energy, a calculation module configured to calculate an amount of energy received from the detection object by the transmission and reception module, and a determination module configured to determine, based on the amount of energy calculated by the calculation module, the contamination state of the detection object.

Advantageous Effects of Invention

In the embodiment of the present disclosure, the detection object on which a contaminant is to be deposited is inclined relative to the horizontal direction. In the case where the detection object is located in water, the detection unit detects the height of a portion of the inclined detection object that is located in the water and determines whether the detection object is submerged. In the case where the detection object is not submerged, the determination module of the detection unit determines a contamination state of the detection object. As described above, the contamination state can be detected even in the presence of water.

DESCRIPTION OF EMBODIMENTS

Contaminant detectors and refrigeration cycle apparatuses according to embodiments of the present disclosure will be described below with reference to the drawings. Note that the embodiments should not be construed as limiting the present disclosure. Furthermore, note that the relationship between the sizes of components in the following figures including FIG. 1 may differ from that of actual ones. For the sake of understanding the present disclosure, terms representing directions will be used as appropriate. These terms are used herein only for the purpose of description of the present disclosure, and should not be construed as limiting the present disclosure. Examples of the terms representing directions include "upper", "lower", "right", "left", "front", and "rear".

Embodiment 1

Figure 1:
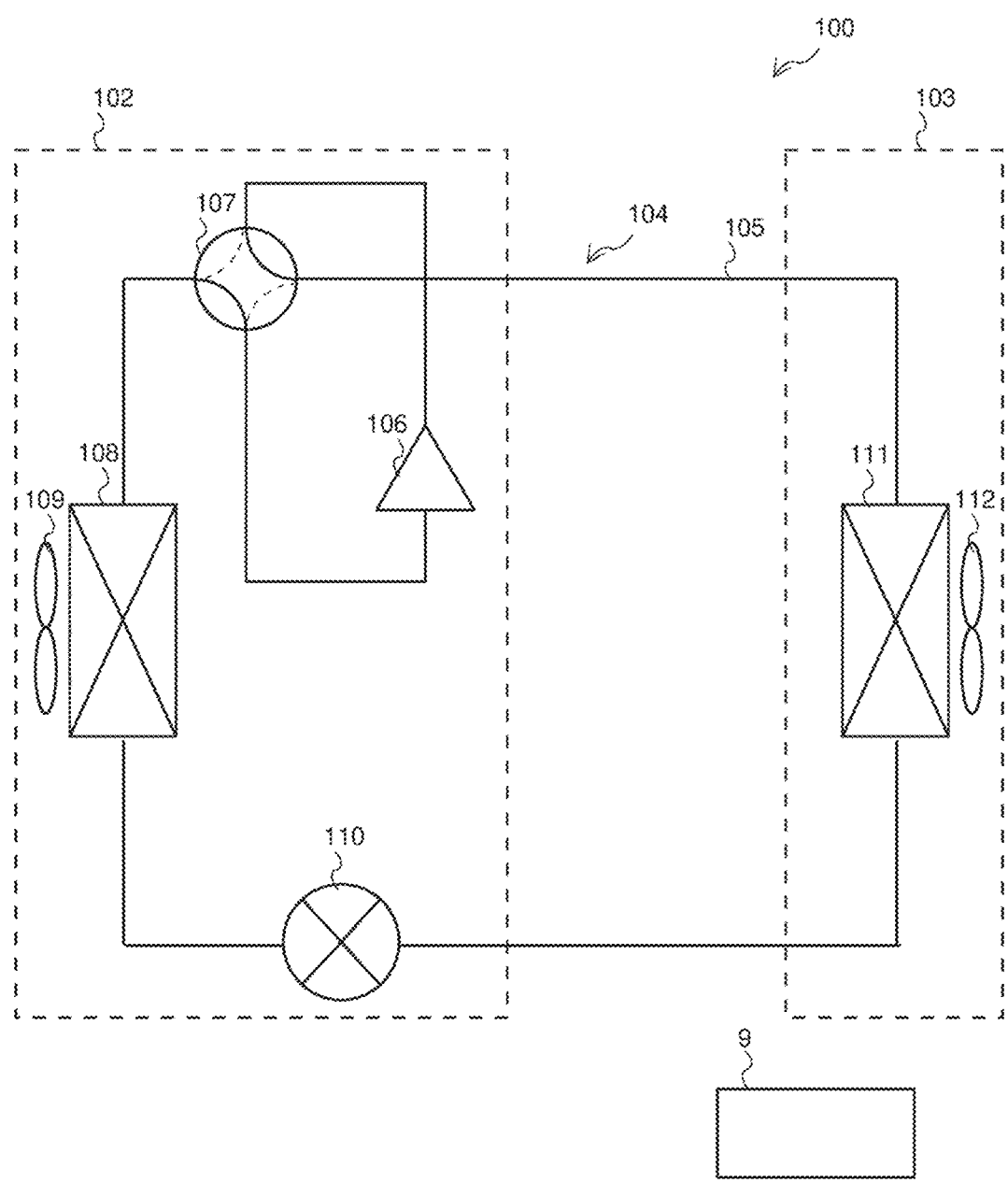
FIG. 1 is a circuit diagram illustrating a refrigeration cycle apparatus in Embodiment 1.

FIG. 1 is a circuit diagram illustrating a refrigeration cycle apparatus 100 in Embodiment 1, The refrigeration cycle apparatus 100 is, for example, an air-conditioning apparatus that conditions air in an indoor space. As illustrated in FIG. 1, the refrigeration cycle apparatus 100 includes an outdoor unit 102, an indoor unit 103, and a controller 9. The outdoor unit 102 includes a compressor 106, a flow switching device 107, a first heat exchanger 108, an outdoor fan 109, and an expansion unit 110. The indoor unit 103 includes a second heat exchanger 111 and an indoor fan 112. The refrigeration cycle apparatus 100 is not limited to an air-conditioning apparatus, and may be a refrigeration apparatus.

The compressor 106, the flow switching device 107, the first heat exchanger 108, the expansion unit 110, and the second heat exchanger 111 are connected by refrigerant pipes 105, thus forming a refrigerant circuit 104. The compressor 106 sucks low-temperature, low-pressure refrigerant, compresses the sucked refrigerant into high-temperature, high-pressure refrigerant, and discharges the compressed refrigerant. The compressor 106 is, for example, a capacity-controllable inverter compressor. The flow switching device 107, which switches between refrigerant flow directions in the refrigerant circuit 104, is a four-way valve, for example. The first heat exchanger 108 exchanges heat between, for example, the refrigerant and outdoor air. The first heat exchanger 108 operates as a condenser in a cooling operation, and operates as an evaporator in a heating operation. The expansion unit 110 is a pressure reducing valve or expansion valve that reduces the pressure of refrigerant to expand the refrigerant. The expansion unit 110 is, for example, an electronic expansion valve having an adjustable opening degree.

The second heat exchanger 111 exchanges heat between, for example, the refrigerant and indoor air. The second heat exchanger 111 operates as an evaporator in the cooling operation, and operates as a condenser in the heating operation. The indoor fan 112 is a device that sends the indoor air to the second heat exchanger 111.

(Operation Mode: Cooling Operation)

Operation modes of the refrigeration cycle apparatus 100 will now be described. The cooling operation will first be described. In the cooling operation, the refrigerant sucked by the compressor 106 is compressed into high-temperature, high-pressure gaseous refrigerant and is then discharged by the compressor 106. The high-temperature, high-pressure gaseous refrigerant discharged from the compressor 106 passes through the flow switching device 107 and flows into the first heat exchanger 108, serving as a condenser. In the first heat exchanger 108, the refrigerant exchanges heat with the outdoor air sent by the outdoor fan 109 and thus condenses and liquifies. The condensed liquid refrigerant flows into the expansion unit 110. In the expansion unit 110, the refrigerant is expanded and reduced in pressure, and thus turns into refrigerant in a low-temperature, low-pressure, two-phase gas-liquid state. The refrigerant in the two-phase gas-liquid state flows into the second heat exchanger 111, serving as an evaporator. In the second heat exchanger 111, the refrigerant exchanges heat with the indoor air sent by the indoor fan 112, and thus evaporates and gasifies. At this time, the indoor air is cooled, thus cooling the indoor space. The evaporated, low-temperature, low-pressure gaseous refrigerant passes through the flow switching device 107 and is then sucked into the compressor 106.

(Operation Mode: Heating Operation)

The heating operation will now be described. In the heating operation, the refrigerant sucked by the compressor 106 is compressed into high-temperature, high-pressure gaseous refrigerant and is then discharged by the compressor 106. The high-temperature, high-pressure gaseous refrigerant discharged from the compressor 106 passes through the flow switching device 107 and flows into the second heat exchanger 111, serving as a condenser. In the second heat exchanger 111, the refrigerant exchanges heat with the indoor air sent by the indoor fan 112, and thus condenses and liquefies. At this time, the indoor air is heated, thus heating the indoor space. The condensed liquid refrigerant flows into the expansion unit 110. In the expansion unit 110, the refrigerant is expanded and reduced in pressure, and thus turns into refrigerant in the low-temperature, low-pressure two-phase gas-liquid state. The refrigerant in the two-phase gas-liquid state flows into the first heat exchanger 108, serving as an evaporator. In the first heat exchanger 108, the refrigerant exchanges heat with the outdoor air sent by the outdoor fan 109, and thus evaporates and gasifies. The evaporated, low-temperature, low-pressure gaseous refrigerant passes through the flow switching device 107 and is then sucked into the compressor 106.

The refrigeration cycle apparatus 100 may exclude the flow switching device 107. In this case, the refrigeration cycle apparatus 100 is a dedicated cooling apparatus or a dedicated heating apparatus.

The controller 9 is configured as dedicated hardware or a central processing unit (CPU) (also called a processing unit, an arithmetic unit, a microprocessor, a microcomputer, or a processor) that runs a program stored in a storage device. In the case where the controller 9 is dedicated hardware, the controller 9 corresponds to, for example, a single circuit, a composite circuit, an application specific integrated circuit (ASIC), a field-programmable gate array (FPGA), or a combination thereof. Functional parts that the controller 9 implements may be implemented by individual hardware components or may be implemented by a single hardware component.

In the case where the controller 9 is a CPU, functions that the controller 9 performs are implemented by software, firmware, or a combination of software and firmware. Software and firmware are described as programs. The CPU reads and runs the programs, thus implementing the functions. A subset of the functions of the controller 9 may be implemented by dedicated hardware, and another subset thereof may be implemented by software or firmware.

Figure 2:
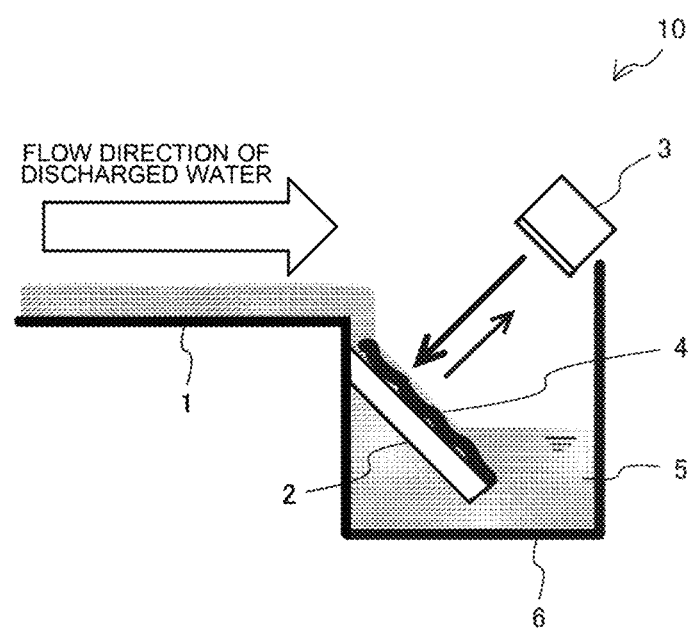
FIG. 2 is a schematic diagram illustrating a contaminant detector according to Embodiment 1.

FIG. 2 is a schematic diagram illustrating a contaminant detector 10 according to Embodiment 1. As illustrated in FIG. 2, the first heat exchanger 108 includes a drain pan 1 and a drainage unit 6.

(Drain Pan 1)

The drain pan 1, to which water 5 is discharged, is a sump that receives water droplets or the discharged water 5. The drain pan 1 tends to have a gently sloping surface extending to the drainage unit 6. Such a surface facilitates the flow of the discharged water 5 to the drainage unit 6.

(Drainage Unit 6)

The drainage unit 6, which accumulates discharged water from the drain pan 1, is a drainage channel, for example. The drainage unit 6 is a place to temporarily accumulate water droplets or the discharged water 5 until the water flows downstream. The drainage unit 6 may have a hollow to temporarily retain the water 5. The water 5 accumulated in the drainage unit 6 is discharged to the outside, for example, through a drainage pipe (not illustrated) or by a drainage pump (not illustrated). The drainage unit 6 is likely to be contaminated because of long exposure to the accumulated water 5. For example, the drainage pipe or the drainage pump may be clogged with contaminants 4. Thus, the water 5 accumulated in the drainage unit 6 may fail to be discharged, resulting in an increase in water level in the drainage unit 6. If the accumulated water 5 is contaminated by the contaminants 4, the water 5 may have an unevenly colored, translucent appearance.

(Contaminants 4)

The contaminants 4 include contamination with microorganisms. The contaminants 4 are not limited to contamination with microorganisms. The contaminants 4 may have a translucent appearance. The term "contamination with microorganisms" as used herein refers to a combination of dirt components in the air and mucilaginous polysaccharides metabolized by, for example, bacteria or mold. Contamination with microorganisms include contamination by a viscous aggregate called a biofilm or a slime. The contaminants 4 containing microorganisms can encourage the growth of bacteria or mold that is hazardous to humans, and pose a pathogenic risk when dispersed in the air. Therefore, for example, an air-conditioning apparatus, which is a target of legal inspection under the Act on Maintenance of Sanitation in Buildings, needs to be subjected to periodic inspection.

As illustrated in FIG. 2, the contaminant detector 10, which detects a state of contamination by the contaminants 4, includes a detection object 2 and a detection unit 3. In Embodiment 1, the contaminant detector 10 is used in the air-conditioning apparatus, serving as the refrigeration cycle apparatus 100. The contaminant detector 10 can be used in, for example, an industrial plant, a drainage channel around a water supply system, and an apparatus including a drainage channel.

(Detection Object 2)

The detection object 2 is a flat or plate-shaped part that is inclined relative to the horizontal direction in the drainage unit 6 and on which the contaminants 4 can be deposited. The larger the angle of inclination of the detection object 2 relative to the horizontal direction is, the more preferable it is. The angle of inclination is not limited to any angle. The detection object 2 is preferably inclined from the drain pan 1 toward the bottom of the drainage unit 6 so that the detection object 2 can be contaminated by water droplets or the discharged water 5. Thus, the water droplets or discharged water 5 flows on the detection object 2. In other words, the detection object 2 is located downstream in a flow direction of the water 5 in the drainage unit 6. The detection object 2 is joined at at least one point to the drainage unit 6. This eliminates the likelihood that the detection object 2 may interfere with accumulation of the water 5.

The detection object 2 preferably defines a space with a side or the bottom of the drainage unit 6 so that the entire bottom of the drainage unit 6 is not covered with the detection object 2. The detection object 2 is preferably made of a material that can be contaminated to the same extent as that to which the drainage unit 6 is contaminated. For example, the detection object 2 may be made of the same material as that of the drainage unit 6. The detection object 2 may be contaminated to the same extent as that to which the drainage unit is contaminated by changing the surface roughness, hydrophilicity, and other properties of the detection object 2. Like the drainage unit 6, the detection object 2, which is disposed in the drainage unit 6, is likely to be contaminated because of long exposure to the water 5 accumulated in the drainage unit 6.

(Detection Unit 3)

The detection unit 3 emits energy toward the detection object 2 to detect a contamination state of the detection object 2. The detection unit 3 detects whether the contaminants 4 on the detection object 2 in the drainage unit 6 are submerged. Furthermore, the detection unit 3 determines the amount of contamination by the contaminants 4 when detecting the contaminants 4. The detection unit 3 is disposed above the drainage unit 6 and faces the detection object 2 in a non-contact manner. The detection unit 3 emits energy toward the detection object 2 and then receives reflected energy.

The detection unit 3 detects, based on a received signal, whether the detection object 2 is submerged. When the detection object 2 is not submerged, the detection unit 3 detects the presence or absence of contaminants 4 on the detection object 2. Upon detecting the presence of contaminants 4, the detection unit 3 determines the amount of contamination by the contaminants 4. In other words, the detection unit 3 can detect the presence or absence of submersion of the detection object 2, the amount of contamination by the contaminants 4, and the detection object 2 with no contaminants 4. Therefore, the detection unit 3 detects a water level relative to the detection object 2 when it is not clear whether the detection object 2 is submerged, and detects the presence or absence of contamination and the amount of contamination when the detection object 2 is not submerged.

Figure 3:
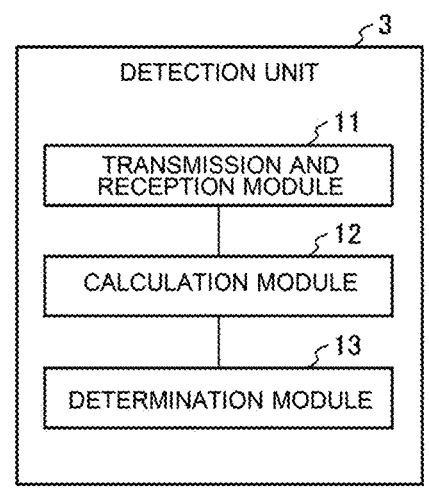
FIG. 3 is a functional block diagram of a detection unit in Embodiment 1.

FIG. 3 is a functional block diagram of the detection unit 3 in Embodiment 1. As illustrated in FIG. 3, the detection unit 3 includes a transmission and reception module 11, a calculation module 12, and a determination module 13.

(Transmission and Reception Module 11)

The transmission and reception module 11 emits and receives energy, and is a sensor, for example. The transmission and reception module 11 is of a non-contact type. Examples of the transmission and reception module 11 include a photoelectric sensor, a capacitive proximity switch, an ultrasonic sensor, a laser Doppler meter, a camera, a charge-coupled device (CCD) image sensor, and a complementary metal-oxide semiconductor (CMOS) image sensor. The transmission and reception module 11, which is of the non-contact type, has excellent environmental resistance.

(Calculation Module 12)

The calculation module 12 calculates the amount of energy received by the transmission and reception module 11. For example, the calculation module 12 obtains the total amount of received energy or the intensity of reflected energy.

(Determination Module 13)

The determination module 13 determines, based on the amount of energy calculated by the calculation module 12, a contamination state of the detection object 2. Specifically, the determination module 13 determines, based on the amount of energy calculated by the calculation module 12, whether the detection object 2 is submerged. Then, the determination module 13 determines, based on the amount of energy calculated by the calculation module 12, the amount of contaminants 4 deposited on the detection object 2. The calculation module 12 and the determination module 13 may be mounted on an electric circuit included in the detection unit 3.

(Operations of Contaminant Detector 10)

Operations of the contaminant detector 10 will now be described. In Embodiment 1, the detection unit 3 operates at any time. The transmission and reception module 11 of the detection unit 3 is an ultrasonic sensor. The detection object 2 is made of the same material as that of the drainage unit 6. An upstream portion of the detection object 2 is fixed to the drainage unit 6. An operation of the contaminant detector 10 in a state where the detection object 2 is not submerged and that in a state where the detection object 2 is submerged will be described separately.

Figure 4:
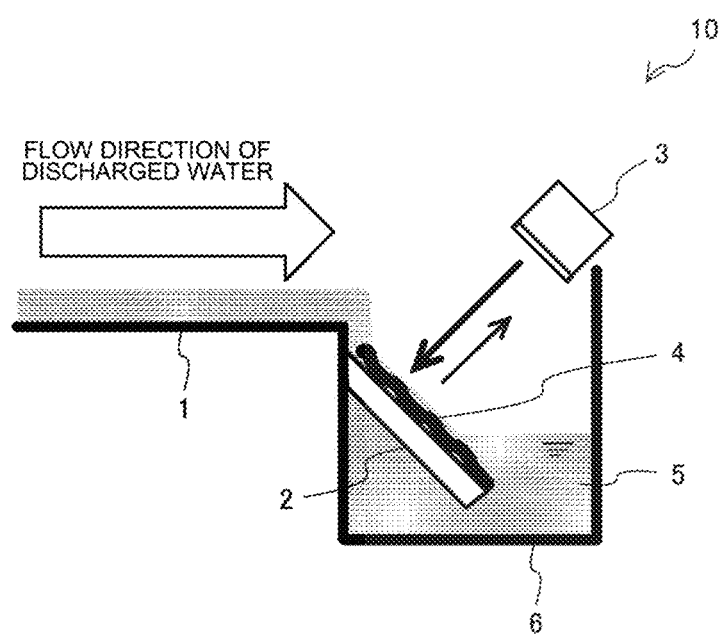
FIG. 4 is a schematic diagram illustrating the contaminant detector according to Embodiment 1 at a low water level.

FIG. 4 is a schematic diagram illustrating the contaminant detector 10 according to Embodiment 1 at a low water level. The state where the detection object 2 is not submerged will first be described. In FIG. 4, an open arrow represents a flow direction of the water 5, and solid-line arrows represent energy emitted and received by the detection unit 3. As illustrated in FIG. 4, water droplets or the discharged water 5 is received by the drain pan 1. Since the drain pan 1 has a gently sloping surface extending to the drainage unit 6, the discharged water 5 smoothly flows to and accumulates in the drainage unit 6. The detection object 2 is inclined from the drain pan 1 toward the bottom of the drainage unit 6. Thus, the water droplets or discharged water 5 flows on the detection object 2 and accumulates in the drainage unit 6. Since the water 5 flows on the detection object 2, the contaminants 4, or a combination of dirt components in the air and water, are likely to form on the detection object 2. Therefore, the detection object 2 can be used to simulate contaminants 4 in the drainage unit 6, which is likely to suffer from contamination.

When the water 5 is discharged to the outside, for example, through the drainage pipe or by the drainage pump, at a rate higher than a rate at which the water 5 is accumulated, the detection object 2 is not submerged, as illustrated in FIG. 4. The transmission and reception module 11 of the detection unit 3 emits energy toward the detection object 2 and then receives reflected energy. The calculation module 12 calculates the amount of received energy. The determination module 13 determines, based on the amount of received energy, that the detection object 2 is not submerged. The determination module 13 then determines the amount of contaminants 4 deposited on the detection object 2.

In Embodiment 1, the transmission and reception module 11 is the ultrasonic sensor. In this case, the detection unit 3 determines a contamination state by using, as an index, the intensity of a received signal depending on, for example, the extent of attenuation of ultrasonic waves, specular reflection, or non-specular reflection. The intensities of received signals have the following relationship: the intensity in a state with no contaminants 4>the intensity in a state with the contaminants 4>the intensity in a state where the detection object 2 is submerged. As described above, the detection unit 3 detects that the detection object 2 is not submerged, and detects the presence or absence of contaminants 4 on the detection object 2. The detection unit 3 also determines the amount of contaminants 4 on the basis of the intensity of a received signal. In this case, the detection unit 3 performs detection based on a received signal that depends on the extent of attenuation of ultrasonic waves. If the contaminants 4 are translucent, the detection unit 3 can detect the contaminants 4. Furthermore, if the accumulated water 5 is contaminated and has an unevenly colored or translucent appearance, the detection object 2 can detect the presence or absence of submersion of the detection object 2.

Figure 5:
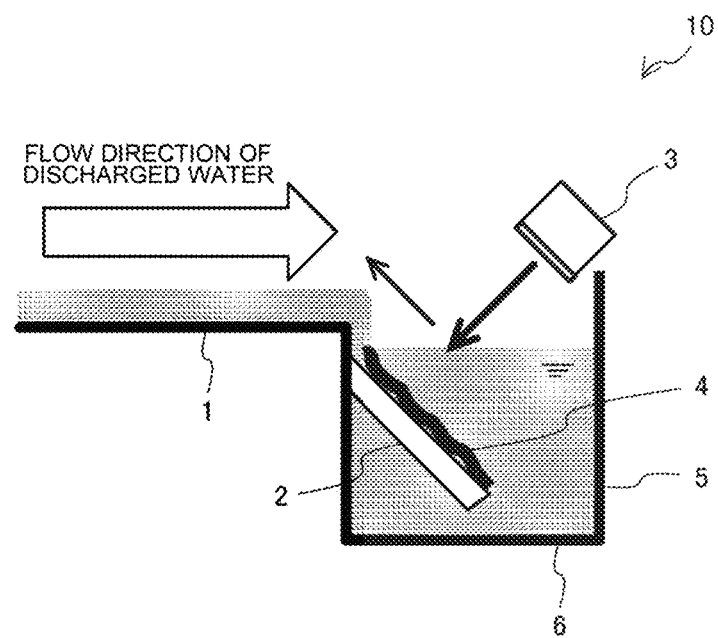
FIG. 5 is a schematic diagram illustrating the contaminant detector according to Embodiment 1 at a high water level.

FIG. 5 is a schematic diagram illustrating the contaminant detector 10 according to Embodiment 1 at a high water level. The state where the detection object 2 is submerged will now be described. In FIG. 5, an open arrow represents the flow direction of the water 5, and solid-line arrows represent energy emitted and received by the detection unit 3. When the water 5 is discharged to the outside, for example, through the drainage pipe or by the drainage pump, at a rate lower than a rate at which the water 5 is accumulated, the detection object 2 is submerged, as illustrated in FIG. 5. The transmission and reception module 11 of the detection unit 3 emits energy toward the detection object 2 and then receives reflected energy. The calculation module 12 calculates the amount of received energy. The determination module 13 determines, based on the amount of received energy, that the detection object 2 is submerged. If the detection object 2 is located in an upper portion of the drainage unit 6, the detection unit 3 can detect a high water level in the drainage unit 6.

In Embodiment 1, the detection object 2 on which the contaminants 4 can be deposited is inclined relative to the horizontal direction. When the detection object 2 is located in the water 5, the detection unit 3 detects the height of a portion of the inclined detection object 2 that is located in the water 5 to determine whether the detection object 2 is submerged. When the detection object 2 is not submerged, the determination module 13 of the detection unit 3 determines a contamination state of the detection object 2. As described above, the contamination state can be detected even in the presence of the water 5.

The contaminants 4 include a contamination state with microorganisms. The contaminant detector 10 according to Embodiment 1 may be an alternative to legal inspection under the Act on Maintenance of Sanitation in Buildings. Since the detection unit 3 receives a signal reflected from the detection object 2 to detect a contamination state, the appearance of the accumulated water 5 hardly interferes with detection. Furthermore, the operation timing of the detection unit 3 is not limited to timing after a drainage process. Since the detection unit 3 can operate at any time, the amount of contaminants 4 can be detected before a water level in the drainage unit 6 is abnormally high due to the contaminants 4 blocking the drainage pipe or the drainage pump.

In Embodiment 1, a contamination state can be detected in the above-described manner before the occurrence of an abnormal state where the water level is abnormally high. In the case where the refrigeration cycle apparatus 100 is an air-conditioning apparatus, the drain pan 1 to receive discharged water is a target of legal inspection under the Act on Maintenance of Sanitation in Buildings and is subjected to periodic inspection. In periodic inspection, the air-conditioning apparatus typically needs to be disassembled, which is laborious and costly. In contrast, the contaminant detector 10 according to Embodiment 1 can detect the presence or absence of contaminants 4 without the need for disassembly of the air-conditioning apparatus. This results in a reduction in time, effort, and cost.

Embodiment 2

Figure 6:
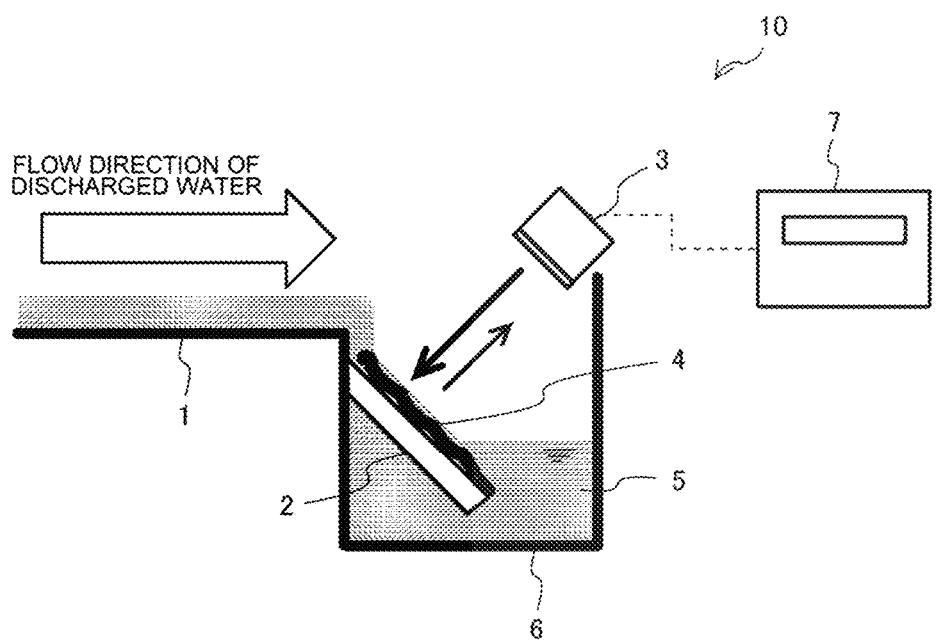
FIG. 6 is a schematic diagram illustrating a contaminant detector according to Embodiment 2.

FIG. 6 is a schematic diagram illustrating a contaminant detector 10 according to Embodiment 2. Embodiment 2 differs from Embodiment 1 in that the contaminant detector includes a notification unit 7. In Embodiment 2, parts that are common to Embodiment 1 are designated by the same reference signs, and description thereof is omitted. The following description will focus on the difference between Embodiments 1 and 2.

As illustrated in FIG. 6, the notification unit 7 is connected to the detection unit 3, and provides notification of a contamination state detected by the detection unit 3. The notification unit 7 provides notification that, for example, cleaning and maintenance are required because of submersion of the drainage unit 6 or contamination of the drainage unit 6 by the contaminants 4. The notification unit 7 includes a light, an electronic notice board, buzzer sound, and a network. The notification unit 7 provides notifications associated with detection results of the detection unit 3, and the detection results show a small amount of contaminants 4, a large amount of contaminants 4, and submersion of the drainage unit 6. The notification unit 7 may include a storage medium to store the detection results of the detection unit 3 and a microcomputer to check the stored detection results. In this case, if a detection result showing submersion of the drainage unit 6 is obtained, the notification unit 7 can provide, by using the storage medium, notification of the submersion as long as the preceding detection result shows a large amount of contaminants 4.

In Embodiment 2, the contaminant detector 10 further includes the notification unit 7 to provide notification of a contamination state detected by the detection unit 3. The notification unit 7 provides notification of the need for, for example, cleaning and maintenance, in each of the case where the drainage unit 6 is submerged and the case where the amount of contaminants 4 is large. Thus, good sanitary conditions of the drain pan 1 can be maintained, and a reduction in time, effort, and cost for inspection can be achieved. In the case where the refrigeration cycle apparatus 100 is an air-conditioning apparatus, the drain pan 1 to receive discharged water is a target of legal inspection under the Act on Maintenance of Sanitation in Buildings and is subjected to periodic inspection. In periodic inspection, the air-conditioning apparatus typically needs to be disassembled, which is laborious and costly. In contrast, the contaminant detector 10 according to Embodiment 1 includes the notification unit 7 and provides notification of the presence or absence of contaminants 4 without the need for disassembly of the air-conditioning apparatus. Therefore, the contaminant detector 10 can prompt a user to perform, for example, cleaning and maintenance.

Embodiment 3

Figure 7:
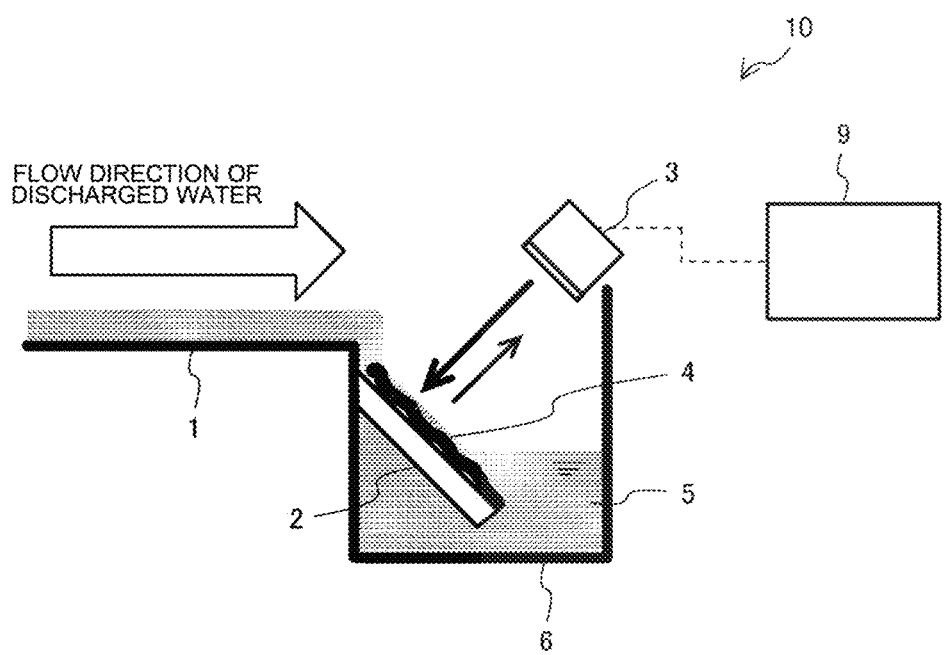
FIG. 7 is a schematic diagram illustrating a contaminant detector according to Embodiment 3.

FIG. 7 is a schematic diagram illustrating a contaminant detector 10 according to Embodiment 3. Embodiment 3 differs from Embodiments 1 and 2 in the operation timing of the detection unit 3. In Embodiment 3, parts that are common to Embodiments 1 and 2 are designated by the same reference signs, and description thereof is omitted. The following description will focus on the difference between Embodiment 3 and Embodiments 1 and 2.

As illustrated in FIG. 7, the controller 9 is connected to the detection unit 3, and causes the detection unit 3 to operate at predetermined operation timing. The refrigeration cycle apparatus 100 has operation steps including the start of operation, a steady state operation, a drainage process, a drying process, and the stop of operation. The controller 9 causes the detection unit 3 to operate at a time determined for each of the operation steps. The controller 9 causes the detection unit 3 to operate at any timing. The controller 9 causes the detection unit 3 to operate at a predetermined time for each of the operation steps, for example, A minutes after the start of operation, every B minutes during the steady state operation, C minutes after the drainage process, every D minutes during the drying process, and E minutes after the stop of operation.

In the case where the drying process is performed during the steady state operation of the refrigeration cycle apparatus 100, the controller 9 causes the detection unit 3 to operate every D minutes. When the refrigeration cycle apparatus 100 is returned to the steady state operation at completion of the drainage process and the drying process, the controller 9 again causes the detection unit 3 to operate every B minutes. The controller 9 causes the detection unit 3 to operate E minutes after the stop of operation of the refrigeration cycle apparatus 100.

In Embodiment 3, the refrigeration cycle apparatus further includes the controller 9 that causes the detection unit 3 to operate at a time determined for each of the operation steps including the start of operation, the steady state operation, the drainage process, the drying process, and the stop of operation. As described above, for example, detection of the presence or absence of contaminants 4 and detection of whether the drainage unit 6 is submerged are performed not only at completion of the drainage process but also at each of the operation steps, such as the start of operation, the steady state operation, the drying process, and the stop of operation.

REFERENCE SIGNS LIST

1: drain pan, 2: detection object, 3: detection unit, 4: contaminants, 5: water, 6: drainage unit, 7: notification unit, 9: controller, 10: contaminant detector, 11: transmission and reception module, 12: calculation module, 13: determination module, 100: refrigeration cycle apparatus, 102: outdoor unit, 103: indoor unit, 104: refrigerant circuit, 105: refrigerant pipe, 106: compressor, 107: flow switching device, 108: first heat exchanger, 109: outdoor fan, 110: expansion unit, 111: second heat exchanger, 112: indoor fan

The invention claimed is:

1. A contaminant detector comprising:
   a detection object that is a flat plate and that is inclined relative to a bottom surface of a drainage channel for accumulation of discharged water and on which a contaminant is to be deposited; and
   a detector configured to emit energy toward the detection object to detect a contamination state of the detection object,
   the detector including
      a transmitter/receiver configured to emit and receive energy,
      a calculator configured to calculate an amount of energy received from the detection object by the transmitter/receiver, and
      a determiner configured to determine, based on the amount of energy calculated by the calculator, the contamination state of the detection object,
   wherein the determiner is configured to determine, based on the amount of energy calculated by the calculator, whether the detection object is submerged.

2. The contaminant detector of claim 1, wherein the determiner is configured to determine, based on the amount of energy calculated by the calculator, an amount of the contaminant deposited on the detection object.

3. The contaminant detector of claim 1, wherein the detector is of a non-contact type.

4. The contaminant detector of claim 1, wherein the contamination state includes contamination with microorganisms.

5. The contaminant detector of claim 1, further comprising:
   a notifier configured to provide notification of the contamination state detected by the detector.

6. The contaminant detector of claim 1, wherein the detection object is located downstream in a water flow direction in the drainage channel.

7. A refrigeration cycle apparatus comprising:
   a refrigerant circuit in which a compressor, a first heat exchanger, an expander, and a second heat exchanger are connected by refrigerant pipes; and
   the contaminant detector of claim 1,
   wherein the first heat exchanger includes a drain pan to which water is discharged, and the drainage channel is configured to accumulate discharged water from the drain pan.

8. The refrigeration cycle apparatus of claim 7,
   wherein the refrigeration cycle apparatus has operation steps including a start of operation, a steady state operation, a drainage process, a drying process, and a stop of operation, and wherein the refrigeration cycle apparatus further comprises a controller configured to cause the detector to operate at a time determined for each of the operation steps.

* * * * *